United States Patent [19]

Shih et al.

[11] Patent Number: 5,445,366

[45] Date of Patent: Aug. 29, 1995

[54] HYDRAULIC SHOCK ABSORBING DEVICE FOR A BICYCLE FRONT FORK

[75] Inventors: Ruey-Sheng Shih; Kevin J. Yeh; Show-Shyang Chow; Jui-Chi Hung; Shi-Shiow Chen, all of Hsin Chu, Taiwan

[73] Assignee: Industrial Technology Research Corporation, Hsin Chu Hsien, Taiwan

[21] Appl. No.: 257,010

[22] Filed: Jun. 8, 1994

[51] Int. Cl.$^6$ .............................................. F16M 5/00
[52] U.S. Cl. .................................. 267/140.13; 280/276
[58] Field of Search ................. 267/35, 118, 122, 123, 267/140.13, 217; 280/276, 277

[56] References Cited

U.S. PATENT DOCUMENTS

| | | | |
|---|---|---|---|
| 4,352,487 | 10/1982 | Shtarkman | 267/140.13 X |
| 4,401,298 | 8/1983 | Eaton et al. | 267/140.13 |
| 5,088,705 | 2/1992 | Tsai | 280/276 X |
| 5,310,203 | 5/1994 | Chen | 280/276 |

FOREIGN PATENT DOCUMENTS 2180620 4/1987 United Kingdom ............... 280/276

Primary Examiner—Robert J. Oberleitner
Assistant Examiner—Kevin D. Rutherford
Attorney, Agent, or Firm—Jacobson, Price, Holman & Stern

[57] ABSTRACT

A hydraulic shock absorbing device fastened inside either blade of a bicycle front fork to absorb shocks, the device including a damping liquid chamber and a damping liquid cell respectively molded from rubber or elastic material and connected together through a partition plate having liquid passages for the passing of a damping liquid between the damping liquid chamber and the damping liquid cell to let shocks transmitted from the bicycle front fork be absorbed. Shock absorbing rubber blocks or springs may be mounted on two opposite ends of the hydraulic shock absorbing device when it is installed in the bicycle front fork.

8 Claims, 4 Drawing Sheets

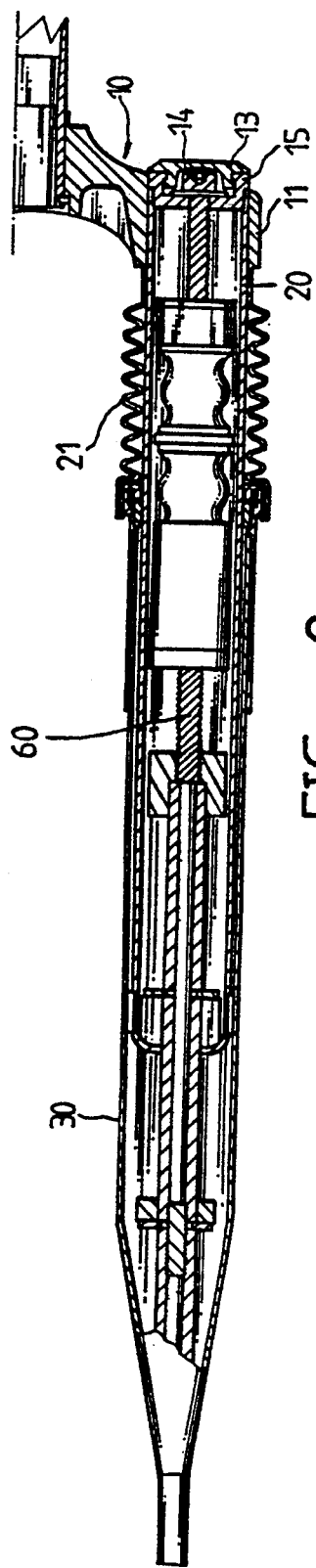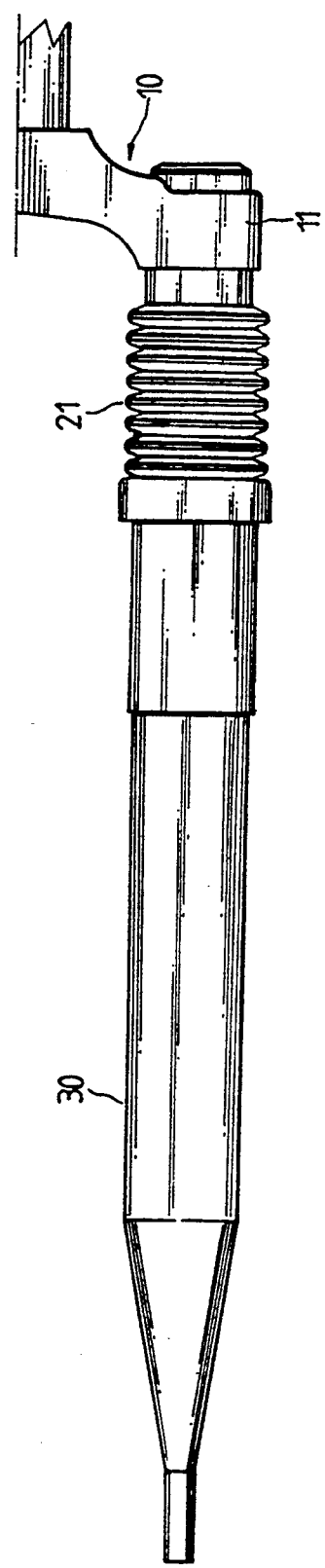
FIG 2
PRIOR ART
FIG 1

5,445,366

HYDRAULIC SHOCK ABSORBING DEVICE FOR A BICYCLE FRONT FORK

FIELD OF THE INVENTION

The present invention relates to a hydraulic shock absorbing device for a bicycle front fork which comprises a damping liquid chamber and a damping liquid cell respectively made from an elastic material such as rubber and connected through a partition plate with liquid passages. When the damping liquid chamber is compressed, the damping liquid cell is deformed causing the circulation of a damping liquid between the damping liquid chamber and the damping liquid cell so that shocks are absorbed.

BACKGROUND OF THE INVENTION

The front fork of a bicycle, as shown in FIG. 1, is generally comprised of a blade holder 10 for connection to the bicycle's head tube, two tubular upper fork blades 20 bilaterally and fixedly connected to two fork blade coupling portions 11 of the blade holder 10 at the bottom and each having a bellows tube 21 at the bottom, and two tubular lower fork blades 30 respectively connected to the bellows tube 21 of either tubular upper fork blades 20 at the bottom. Inside the bellows tube 21, a shock absorbing device is installed to absorb shocks transmitted from the front fork. Various hydraulic and pneumatic shock absorbing devices as well as shock absorbing springs have been disclosed for this purpose. These shock absorbing devices are commonly heavy and/or complicated in the structure. Therefore, the installation of a conventional shock absorbing device significantly increases the weight of the front fork of the bicycle.

SUMMARY OF THE INVENTION

The present invention has been accomplished to provide a shock absorbing device for a bicycle front fork which eliminates the aforesaid drawbacks. An objective of the present invention to provide a shock absorbing device for a bicycle front fork which is simple in structure. Additionally providing a shock absorbing device for a bicycle front fork which is easy to install is another objective of the present invention. Still yet another objective of the present invention is to provide a shock absorbing device for a bicycle front fork which is lightweight. Furthermore, providing a shock absorbing device for a bicycle front fork which effectively absorbs shock transmitted from the front fork is another objective of the present invention, According to one aspect of the present invention, the shock absorbing device comprised of at least one compressible damping liquid chamber and a compressible damping liquid cell respectively connected together through a partition plate having liquid passages for the passing through of damping liquid between the damping liquid chamber and the damping liquid cell to let shock transmitted from the bicycle front fork be absorbed.

According to another aspect of the present invention, the damping liquid chamber and the damping liquid cell are respectively made from rubber or suitable elastic plastics so that they are not heavy and can be easily compressed.

According to still another aspect of the present invention, the damping liquid chamber and the damping liquid cell form a water-tight chamber whereby a leakage of damping liquid is prevented.

According to still another aspect of the present invention, shock absorbing rubber blocks or springs may be mounted on two opposite ends of the hydraulic shock absorbing device when it is installed in the bicycle front fork so that shock from the front forks can be effectively and rapidly absorbed when the bicycle runs over a rough road or gravel road.

BRIEF DESCRIPTION OF THE DRAWINGS

FIG. 1 shows a conventional bicycle front fork;

FIG. 2 is a longitudinal view in a section of a bicycle front fork according to the present invention;

DETAILED DESCRIPTION OF THE PREFERRED EMBODIMENT

Figure 3:
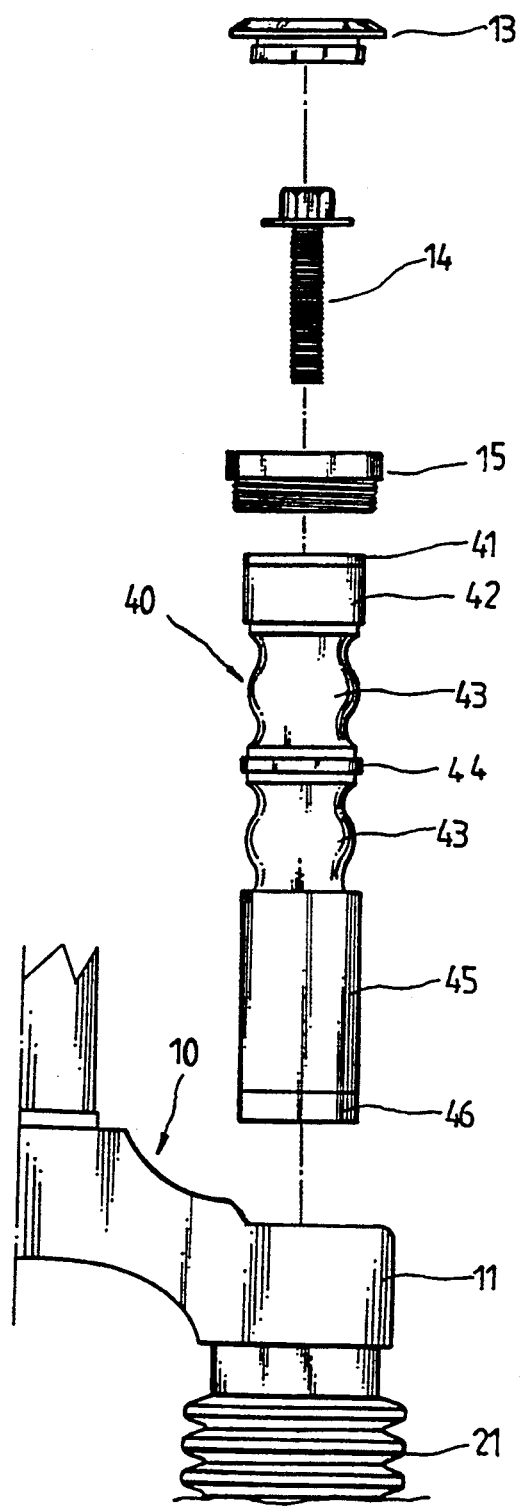
FIG. 3 shows the hydraulic shock absorbing device of the bicycle front fork shown in FIG. 2 dismantled.

A bicycle front fork in accordance with the present invention is shown in FIG. 2 to be generally comprised of a blade holder 10 for connection to the head tube of a bicycle (not shown), two tubular upper fork blades 20 bilaterally and fixedly connected to two fork blade coupling portions 11 of the blade holder 10 at the bottom and each having a bellows tube 21 at the bottom, and two tubular lower fork blades 30 respectively connected to the bellows tube 21 of either tubular upper fork blades 20 at the bottom. Because the two fork blades of the bicycle front fork are symmetrical, only one fork blade is shown and provided with a detailed description.

Referring to FIG. 3 and FIG. 2 again, a screw rod holder 15 is attached to the tubular upper fork blade 20 at the top through a screw joint (or any suitable fastening arrangement) to hold screw rod 14 in place. Screw rod holder 15 has a top recess (not shown) and a screw hole (not shown) through the top recess. Screw rod 14 is threaded into the screw hole of screw rod holder 15 and stopped at top sealing cap 41 of a shock absorbing device 40. The shock absorbing device 40 is received inside the bellows tube 21 and the tubular upper fork blade 20. When screw rod 14 is threaded into the screw hole on screw holder 15, the top recess of screw rod holder 15 is blocked by a cap 13.

Figure 4:
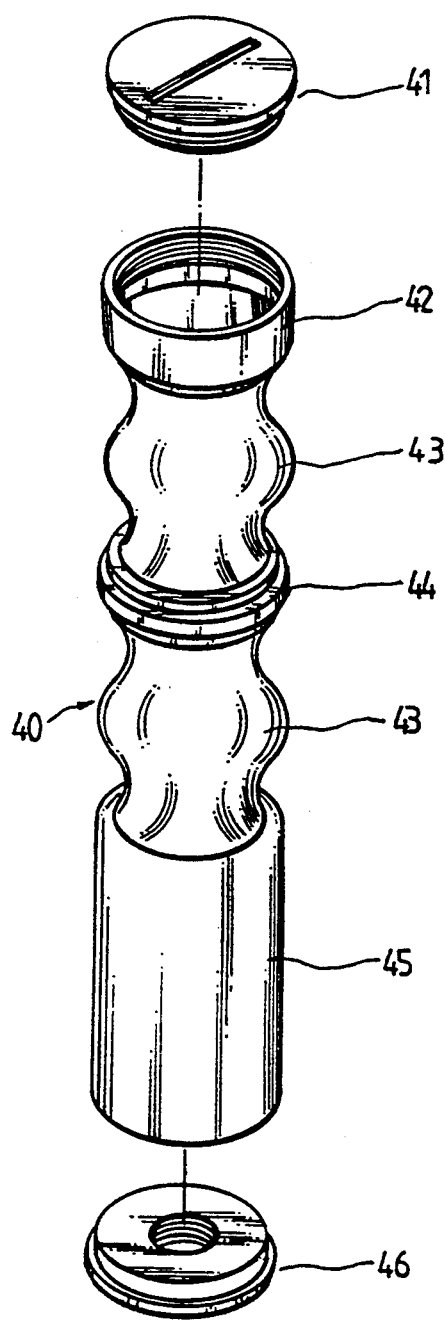
FIG. 4 is an exploded view of the hydraulic shock-absorbing device shown in FIG. 3.
Figure 5:
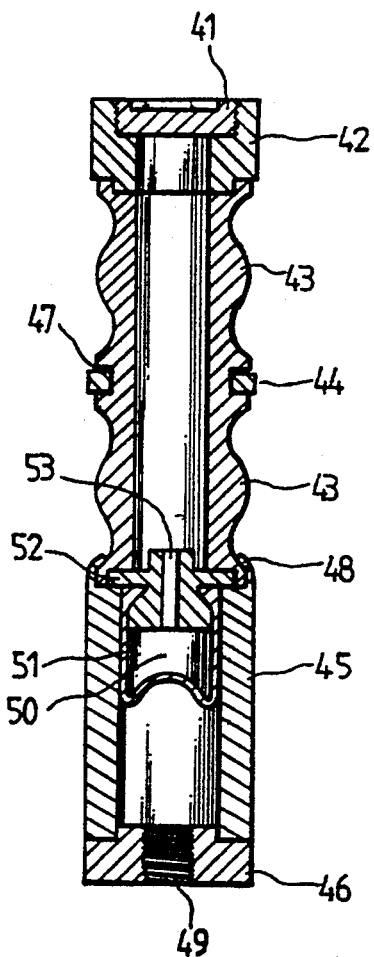
FIG. 5 is a longitudinal view in a section of the hydraulic shock absorbing device shown in FIG. 3.
Figure 6:
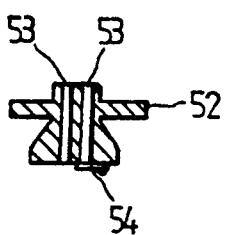
FIG. 6 is a sectional view of an alternate form of the partition plate for the hydraulic shock absorbing device shown in FIG. 3.

Referring to FIGS. 4 and 5, the shock absorbing device 40 comprises of a sealing cap 41, an annular cap holder flange 42, at least one damping liquid chamber 43, at least one collar 44, a damping liquid cell 51, partition plate 52, a barrel 45, and a locating plate 46. The damping liquid chamber 43 is molded from rubber (or any suitable elastic material) of any tubular shape having a corrugated peripheral wall of an uneven thickness so that it can be compressed axially as well as radially. The arrangement of the corrugated outer wall enhances the flexibility and resilience of the damping liquid chamber 43 in the radial direction as well as the axial direction. The number of damping liquid chamber 43 may be increased subject to the length of the front fork. Damping liquid chamber 43 is filled with a damping liquid, having one end connected to the annular cap holder flange 42. Annular cap holder flange 42 is internally threaded. Sealing cap 41 is externally threaded. Therefore, sealing cap 41 can be fastened to the annular cap holder flange 42 through a screw joint. The collar 44 is made around damping liquid chamber 43 to prevent friction from occurring between damping liquid chamber 43 and the inside wall of tubular upper fork blade 20. The number of collar 44 may be increased subject to the length of damping liquid chamber 43. The opposite end of damping liquid chamber 43 is attached on to damping liquid cell 51 with partition plate 52 in between. Partition plate 52 is blocked between damping liquid chamber 43 and damping liquid cell 51, having at least one liquid passage 53. Referring to FIG. 6, when a plurality of liquid passages is made on partition plate 52, some of the liquid passage 53 may be respectively mounted with a check valve 54. One side of each check valve 54 is attached to the partition plate 53 through a screw joint (or any suitable fastening arrangement). Check valve 54 allows the damping liquid to pass through the passage 53 from damping liquid chamber 43 into damping liquid cell 51, however the liquid flowing back to damping liquid chamber 43 becomes blocked. Damping liquid cell 51 is constructed of a rubber diaphragm or suitable elastic material. When damping liquid chamber chamber 43 is compressed, the damping liquid is forced through liquid passages 53 into damping liquid cell 51. Shock waves become absorbed or lessened when the damping liquid flows between damping liquid chamber 43 and damping liquid cell 51. The nature of the damping liquid directly affects the performance of shock absorbing device 40. Therefore, the selected damping liquid must not affect the material properties of damping liquid chambers 43 and damping liquid cell 51. Barrel 45 is connected between partition plate 52 and locating plate 46 to hold damping liquid cell 51 on the inside. Locating plate 46 has a screw hole 49 at the center fastened to a screw rod 60 being fixedly disposed inside the tubular lower fork blade 30 (see FIG. 2).

Sealing cap 41, annular cap holder flange 42, collar 44, partition plate 52, barrel 45 and locating plate 46 of the shock absorbing device 40 are preferably constructed of metal alloys or PLASTIC STEEL since they must either directly or indirectly bear the shock from the bicycle front fork or else support the damping liquid chamber 43 or the damping liquid cell 51.

Referring to FIGS. 2 and 3 again, when tubular upper fork blade 20 and tubular lower fork blade 30 are connected together, the shock absorbing device 40 is inserted into the tubular upper fork blade 20, This permits for screw hole 49 of partition plate 46 to be fastened to screw rod 60 of tubular lower fork blade 30 and be set into position. Next, screw rod holder 15 is fastened to tubular upper fork blade 20 at the top. Screw rod 14 is then threaded into the screw hole on the screw rod holder 15 to hold down the sealing cap 41 of the shock absorbing device 40. Finally, cap 13 is fastened to screw rod holder 15 to block the top recess of screw rod holder 15.

While only one embodiment of the present invention has been illustrated and described, it is noted that various modifications and could be made without departing from the spirit and scope of the invention.

What is claimed is:

1. A hydraulic shock absorbing device fastened inside either blade of a bicycle front fork to absorb shock, the device comprising;

at least one damping liquid chamber molded from elastic material to hold a damping liquid, said damping liquid chamber having a top end mounted with an annular cap holder flange and sealed by a cap and at least one collar around the outside surface of the periphery wall of the said damping liquid chamber thereof;

a partition plate fastened to a bottom end of the said damping liquid chamber and having at least one liquid passage;

a damping liquid cell made from an elastic material and connected to the said partition plate at the bottom for flowing of the said damping liquid between the said damping liquid chamber and said damping liquid cell through said at least one liquid passage to absorb shock upon compression of the said damping liquid chamber; and a barrel having a top end fixed to the said partition plate and a bottom end fastened with a locating plate installed inside the bicycle front fork to hold the said damping liquid cell.

2. The shock absorbing device of claim 1, wherein said damping liquid chamber has a corrugated peripheral wall of uneven thickness so that it can be compressed axially as well as radially.

3. The shock absorbing device of claim 1, wherein said at least one collar of the said damping liquid chamber is stopped against the inside wall of the bicycle front fork to maintain the said damping liquid chamber in place as well as prohibit friction from occurring between the peripheral wall of the said damping liquid chamber and the inside wall of the bicycle front fork when the said damping liquid chamber is compressed.

4. The shock absorbing device of claim 1, wherein the said locating plate has a screw hole at the center fastened to a screw rod fixed inside the bicycle front fork.

5. The shock absorbing device of claim 1 wherein said at least one liquid passage for passing of the damping liquid between the said damping liquid chamber and the said damping liquid cell permits the damping liquid to flow back from the said chamber liquid cell into the said damping liquid chamber.

6. The shock absorbing device of claim 1, wherein the damping liquid does not affect the material properties of the said damping liquid chamber and the said damping liquid cell.

7. The shock absorbing device of claim 1, wherein said cap, said annular flange, said collar, said partition plate, said barrel and said locating plate are made from metal alloy.

8. The shock absorbing device of claim 1, wherein said sealing cap, said annular flange, said collar, said partition plate, said barrel and said locating plate are molded from PLASTIC STEEL.

* * * * *